Patented May 9, 1939

2,157,167

UNITED STATES PATENT OFFICE 2,157,167

ARTICLES OF CELLULOSE ESTERS

Camille Dreyfus, New York, N. Y.

No Drawing. Application February 17, 1937,
Serial No. 126,255

4 Claims. (Cl. 18—57)

This invention relates to the production of articles which are resistant to water and other liquids, which are flexible and which have other desirable properties.

An object of this invention is to prepare articles of cellulose acetate or other organic esters of cellulose of high degree of esterification, which articles are resistant to water and other liquids and are flexible. Other objects of this invention will appear from the following detailed description.

The cellulose acetate ordinarily used for commercial purposes is not a fully acetylated cellulose corresponding to cellulose triacetate, but usually has an acetyl value of less than 55% (determined as acetic acid). While such cellulose acetate has many desirable properties, its resistance to water is not as great as may be desired. Thus, when films or foils made from such cellulose acetate are subjected to prolonged contact with water, they tend to curl or crinkle. Moreover, such films or foils are more or less permeable to water, which greatly reduces their commercial possibility.

It has been proposed that cellulose acetate or other organic esters of cellulose of high degree of esterification be employed to make films or foils of improved resistance to water. However, such films or foils, while substantially impervious to water, are quite brittle and are, therefore, of little commercial value. I have found that by incorporating a suitable quantity of plasticizer in such films or foils the desired flexibility of the same is attained.

In accordance with my invention, I prepare articles of organic esters of cellulose of high degree of esterification, which articles are not only resistant to water, but are also flexible.

Although this invention will be described specifically in connection with cellulose acetate, it is also applicable to other organic esters of cellulose, such as cellulose formate, cellulose propionate and cellulose butyrate. While any cellulose acetate of high acetyl value, i. e. above 55% (determined as acetic acid), say, from 60 to 64%, may be used in accordance with this invention, I have found that articles made from a cellulose acetate having an acetyl value of 62.5% (determined as acetic acid), and particularly a cellulose acetate of such acetyl value made by reacetylating a cellulose acetate of lower acetyl value, are the most satisfactory with respect to resistance to water and flexibility.

Cellulose acetate of high acetyl value may be made in any suitable manner. For instance, a primary solution of cellulose acetate formed by acetylating cellulose with acetic anhydride and sulphuric acid in the presence of acetic acid may be subjected to a hydrolizing or ripening action and/or precipitation action, and the ripening interrupted at such a point that the finished product contains the desired high acetyl value.

I have found, however, that more satisfactory articles may be formed by employing a cellulose acetate of high acetyl value made by reactylating a cellulose acetate of lower degree of acetylation. Thus, a cellulose acetate which is in the form ready for commercial use, that is, a cellulose acetate which has been ripened, washed and stabilized and having, for instance, an acetyl value of between 54 and 55% (determined as acetic acid), is employed as the starting material in the production of a cellulose acetate of high acetyl value. The cellulose acetate of lower degree of acetylation is treated with acetic anhydride in the presence of an acetylizing catalyst. While zinc chloride, a mixture of zinc chloride and hydrochloric acid, phosphoric acid and sulphuric acid may be employed as the acetylizing catalyst, the use of perchloric acid is preferable when reacetylating a cellulose acetate of lower degree of acetylation. The amount of catalyst may vary from 1 to 10% or more, based on the weight of the cellulose acetate being treated, depending on the catalyst and the degree of acetylation desired.

In one form of my invention, films or thin foils of superior quality may be made. As stated, films or foils when made from ordinary cellulose acetate are not as resistant to water as is desired, and when made from cellulose acetate of high degree of acetylation are resistant to water but are brittle. However, if a solution of cellulose acetate of high acetyl value, and particularly a cellulose acetate of high acetyl value which is made by reacteylating a cellulose acetate of lower acetyl value, containing a substantial proportion of plasticizer, i. e. above 35%, based on the weight of the cellulose acetate present, is formed into a film or foil in any suitable manner, it is found that such film or foil is not only impervious to water but is also characterized by being extremely flexible.

In another aspect of this invention a solution containing cellulose acetate of high acetyl value and containing more than 35% of plasticizer may be employed to coat articles of various kinds. Articles of metal, wood, paper, cardboard and the like may have applied thereto as a final coat a solution of the high acetyl cellulose acetate containing a large amount of plasticizer.

Examples of suitable plasticizers or modifiers which may be used with a cellulose acetate of high acetyl value are dibutyl tartrate, dimethyl phthalate, diethyl phthalate, dibutyl phthalate, di (methoxy ethyl) phthalate, ortho- and para-ethyl toluene sulphonamide, triphenyl phosphate, triacetin, etc.

In working up the cellulose acetate of high acetyl value in accordance with this invention, there may be used suitable volatile solvents or diluents, such as tetrachlorethane, methylene chloride, chloroform, ethylene chlorhydrin, ethylene formal, phenol, cresol and mixtures of ethylene dichloride and methyl alcohol, tetrachlorethane and methyl alcohol, phenol and benzol, and cresol and benzol. Ethylene formal was found to be particularly effective as a solvent for cellulose acetate having an acetyl value of 62.5% (determined as acetic acid) formed by reacetylating a cellulose acetate of lower acetyl value.

In order further to illustrate my invention, but without being limited thereto, the following specific examples are given:

Example I

A cellulose acetate that is soluble in acetone and having an acetyl value of 54 to 55% (determined as acetic acid) is employed for reacetylation. This cellulose acetate may be prepared by acetylating cellulose with a mixture of acetic anhydride and sulphuric acid. The cellulose acetate may then be ripened, washed, stabilized and dried in a form ready for ordinary uses. The cellulose acetate may, for instance, be prepared by any of the processes described in the U. S. patents to Henry Dreyfus, Nos. 1,278,885; 1,280,974; 1,280,975; and particularly No. 1,708,787.

A mixture of 5 pounds of the above commercial cellulose acetate, 45 pounds of 95% acetic acid, 375 grams of zinc chloride and 66.5 cc. hypochloric acid, suspended in 41.5 pounds of benzene, is allowed to stand for 24 hours at room temperature. The mixture is then drained from the cellulose acetate and the cellulose acetate heated to drive off the residual benzene. The cellulose acetate is then washed neutral and dried. The reacetylated cellulose acetate has an acetyl value of 62.5% (determined as acetic acid).

Example A

A solution containing 5 parts by weight of the above reacetylated cellulose acetate (having an acetyl value of 62.5%, determined as acetic acid), 2 parts by weight of dibutyl tartrate and 50 parts by weight of ethylene formal, is processed into a film. This film is not only substantially impervious to water but also is characterized by being extremely flexible.

Example B

A solution containing 7.5 parts by weight of reacetylated cellulose acetate (having an acetyl value of 62.5%, determined as acetic acid), 15 parts by weight of phenol and 35 parts by weight of benzol, is processed into a film. The film produced is not only impervious to water but also is characterized by being extremely flexible. This film was orange-red in color and retained a considerable amount of phenol, which phenol, however, is easily removed by extraction with hot benzol.

It is to be understood that the foregoing detailed description is given merely by way of illustration and many alterations may be made therein, without departing from the spirit of my invention.

Having described my invention, what I desire to secure by Letters Patent is:

1. An article of manufacture comprising a cellulose acetate having an acetyl value between 60 and 64%, determined as acetic acid, said cellulose acetate being formed by reacetylating a cellulose acetate of lower acetyl value, and more than 35%, based on the weight of the cellulose acetate present, of plasticizer.

2. An article of manufacture comprising a cellulose acetate having an acetyl value of 62.5%, determined as acetic acid, said cellulose acetate being formed by reacetylating a cellulose acetate of lower acetyl value, and more than 35%, based on the weight of the cellulose acetate present, of plasticizer.

3. Films or foils which are substantially impervious to water and which are flexible, comprising cellulose acetate having an acetyl value of 60 to 64%, determined as acetic acid, said cellulose acetate being formed by reacetylating a cellulose acetate of lower acetyl value, and more than 35%, based on the weight of the cellulose acetate present, of plasticizer.

4. Films or foils which are substantially impervious to water and which are flexible, comprising cellulose acetate having an acetyl value of 62.5%, determined as acetic acid, said cellulose acetate being formed by reacetylating a cellulose acetate of lower acetyl value, and more than 35%, based on the weight of the cellulose acetate present, of plasticizer.

CAMILLE DREYFUS.